(12) United States Patent
Swenson et al.

(10) Patent No.: US 8,617,630 B2
(45) Date of Patent: Dec. 31, 2013

(54) FINE PARTICLE APPLICATOR AND RELATED METHODS

(75) Inventors: Jennifer R. Swenson, Anderson, IN (US); Robert J. Groshong, Yorkton, IN (US); Eduardo C. Escallon, Elwood, IN (US)

(73) Assignee: Terronics Development Corporation, Inc., Elwood, IN (US)

( * ) Notice: Subject to any disclaimer, the term of this patent is extended or adjusted under 35 U.S.C. 154(b) by 0 days.

(21) Appl. No.: 13/213,934

(22) Filed: Aug. 19, 2011

(65) Prior Publication Data

US 2012/0070550 A1 Mar. 22, 2012

Related U.S. Application Data

(60) Provisional application No. 61/375,550, filed on Aug. 20, 2010.

(51) Int. Cl.
| | |
|---|---|
| *A23L 1/00* | (2006.01) |
| *B05C 11/02* | (2006.01) |
| *B05C 1/00* | (2006.01) |
| *B05C 13/00* | (2006.01) |

(52) U.S. Cl.
USPC .............. 426/289; 118/255; 118/64; 118/102

(58) Field of Classification Search
None
See application file for complete search history.

(56) References Cited

U.S. PATENT DOCUMENTS

| | | | |
|---|---|---|---|
| 5,279,863 A | 1/1994 | Escallon | |
| 5,600,425 A * | 2/1997 | Thayer et al. | 399/353 |
| 5,695,826 A | 12/1997 | Escallon | |
| 5,769,276 A * | 6/1998 | Alexander | 222/148 |
| 5,944,233 A * | 8/1999 | Bourne | 222/272 |
| 5,996,855 A | 12/1999 | Alexander et al. | |
| 6,517,900 B1 | 2/2003 | Pierre | |
| 6,875,278 B2 | 4/2005 | Kerbel et al. | |
| 7,217,444 B2 * | 5/2007 | Hays et al. | 427/458 |
| 2003/0066481 A1 * | 4/2003 | Kerbel et al. | 118/620 |

OTHER PUBLICATIONS

International Search Report and Written Opinion from related International Patent Application PCT/US2011/048474 filed Aug. 19, 2001.

* cited by examiner

*Primary Examiner* — Humera Sheikh
*Assistant Examiner* — Subbalakshmi Prakash
(74) *Attorney, Agent, or Firm* — Billion & Armitage; Benjamin C. Armitage

(57) ABSTRACT

Embodiments relate to a fine particle applicator including a loading vessel, a metering roller positioned adjacent the loading vessel, a first stippling roller in contact with the metering roller, a high speed roller, positioned adjacent the metering roller such that bristles of the metering roller and bristles of the high speed roller overlap sufficient to form an interference zone, a second stippling roller, in contact with the high speed roller, a stippling shoe positioned adjacent at least the metering roller and high speed roller and a housing. At least a portion of a surface of the stippling shoe closest to at least the metering roller and high speed roller includes substantially the same curvature as the roller nearest the surface.

17 Claims, 6 Drawing Sheets

FINE PARTICLE APPLICATOR AND RELATED METHODS

RELATED APPLICATION

Figure 1:
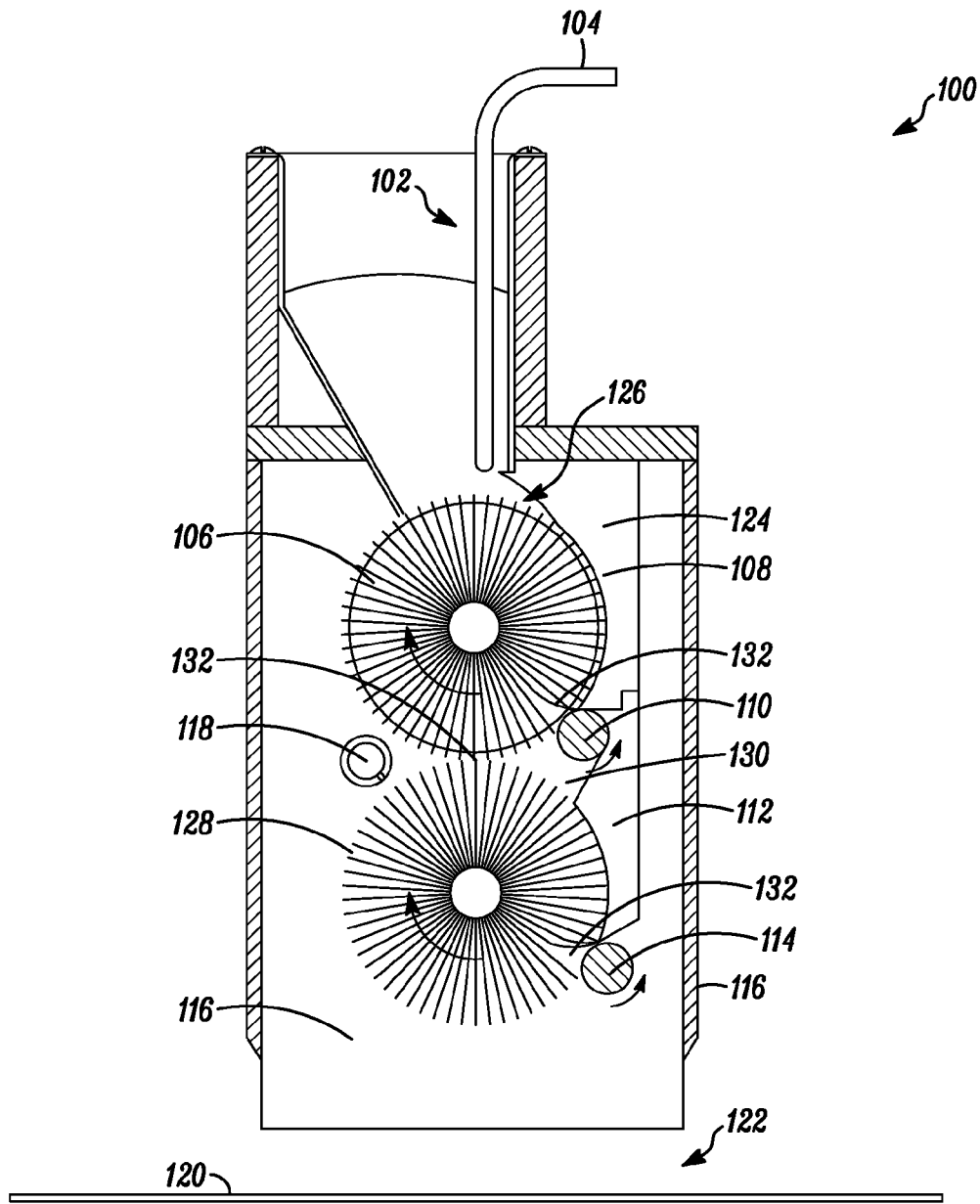

This application claims priority under 35 U.S.C. §119(e) to U.S. Provisional Patent Application No. 61/375,550, filed Aug. 20, 2010, which is incorporated herein by reference in its entirety.

BACKGROUND

Powder feeders and metering devices are used to measure the amount of powder or other flowable material being processed or applied to a target or substrate. The rate of flow can be affected by such variables as humidity, particle size, particle shape, density, material cohesiveness, and chemical composition. These alone, or in combination at times, render many existing powder feeders useless or troublesome.

Metering and aerating of fine particles for application on a substrate or target has been developed for easily flowable materials. But, application of materials that do not flow easily cause problems in traditional devices. Such materials are difficult to measure and meter in an applicator. These materials may form large or hard agglomerates naturally or when exposed to normally benign environmental conditions, such as slight humidity. Examples of such materials may be sugars or salts. Aeration of these materials can be difficult and tribocharging may also occur during an application process causing the material to stick together (form agglomerates) or stick to components of the application device.

SUMMARY

Embodiments relate to a fine particle applicator including a loading vessel, a metering roller positioned adjacent the loading vessel, a first stippling roller in contact with the metering roller, a high speed roller, positioned adjacent the metering roller such that bristles of the metering roller and bristles of the high speed roller overlap sufficient to form an interference zone, a second stippling roller, in contact with the high speed roller, a stippling shoe positioned adjacent at least the metering roller and high speed roller and a housing. At least a portion of a surface of the stippling shoe closest to at least the metering roller and high speed roller includes substantially the same curvature as the roller nearest the surface.

BRIEF DESCRIPTION OF THE DRAWINGS

The accompanying drawings illustrate non-limiting example embodiments of the invention.

FIG. 1 is a cross-sectional view of a fine particle applicator, according to some embodiments.

FIG. 2 is a prospective view of a fine particle applicator, according to some embodiments.

FIG. 3 is a front cut-away prospective view of a fine particle applicator, according to some embodiments.

FIG. 4 is a rear cut-away prospective view of a fine particle applicator, according to some embodiments.

FIG. 5 is a block flow diagram of a method of applying fine particles, according to some embodiments.

FIG. 6 is a cross-sectional view of a fine particle applicator system, according to some embodiments.

DETAILED DESCRIPTION

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms “a” or “an” are used, as is common in patent documents, to include one or more than one, independent of any other instances or usages of “at least one” or “one or more”. In this document, the term “or” is used to refer to a nonexclusive or, such that “A, B or C” includes “A only”, “B only”, “C only”, “A and B”, “B and C”, “A and C”, and “A, B and C”, unless otherwise indicated. The terms “above” and “below” are used to describe two different directions in relation to the center of a composite and the terms “upper” and “lower” may be used to describe two different surfaces of a composite. In the appended aspects or claims, the terms “first”, “second” and “third”, etc. are used merely as labels, and are not intended to impose numerical requirements on their objects.

Embodiments of the present invention describe a fine particle applicator. The applicator is capable of metering and dispensing sticky, cohesive or non-flowable materials in a usable form, including a formed projected cloud of material that can be used with an electrostatic deposition process, such as that typical of co-owned U.S. Pat. Nos. 5,279,863 and 5,695,826.

Agglomerates that frequently occur when powders are handled sometimes fall into a category where they can be quite cohesive either by interlocking mechanical forces or hygroscopic tendencies that produce bonding water molecules (enabling surface tension forces) in even low humidity environments. Embodiments of this invention are unlike either a deagglomerator device which uses momentary rapid acceleration and sometimes wall impact, or the high speed brushes, which use a momentary impact with a relatively high speed bristle to break up the agglomerates. Additionally, embodiments of the present invention require only a fraction of the energy utilized by traditional devices and process. For example, in one embodiment, the tangential speed of the high speed roller is about 60 ft/min compared to about 1500 ft/min in a conventional device, which is about 1225 times less energy, for example. Embodiments described herein use a soft rotating brush bristle forced against a hard smooth rotating element with surface speed differentials between the two. In so doing, a smearing and possibly stippling action occurs which breaks up the large agglomerate. Even though the powder might have sticking tendencies to the rotating element, multiple smearing opportunities insure its removal. In addition, the stippling rollers and optional air jet clean particles from the rollers, enabling the device to self clean.

Referring to FIG. 1, a cross-sectional view 100 of a fine particle applicator is shown, according to some embodiments. A loading vessel 102 may feed a material to a metering roll 106. An optional agitator 104 may be positioned in the loading vessel 102. Particles of the material may enter a deagglomeration zone 126 before contacting the metering roll 106. The metering roll 106 is positioned adjacent a stippling shoe 108, such as an upper stippling shoe 124. The particles are carried by the metering roll 106 to a first stippling roll 110, which is in contact with the metering roll 106.

The particles may then be dropped into an aeration zone 130 before contacting a high speed roller 128. An optional air jet 118 or manifold may be positioned near the metering roller 106 and high speed roller 128 in order to facilitate the removal of any particles not dropped from the high speed roller 128 or ultimately as fine particles 122. The particles may build a static charge and be attracted to a grounded portion (such as a hub) of the high speed roller 128. The optional air flow provided by the jet 118 can disrupt the static attraction. The high speed roller 128 may contact the stippling shoe 108, such as a lower stippling shoe 112. The particles may be carried to a second stippling roller 114, where they are ejected as fine particles 122, such as fine powder or near smoke-like consistency. A housing 116 surrounds the rollers and substantially contains the particles within the applicator. The fine particles 122 may then coat or contact a target substrate 120. Interference zones 132 include the regions where rollers may contact, interact or overlap, for example.

The loading vessel 102 may be a hopper, for example. The vessel 102 may have a low, uniform depth. Material particles utilized in the applicator may be materials (i.e., powders) that are difficult to flow, such as salts, sugars, cinnamon, microsalt, soy protein, cocoa, whey protein, powdered cheese, corn and potato starch, menthol flavor and anti-miotic materials. Embodiments of the present invention may process materials with a Hausner ratio between about 1.1 and about 1.7. The Hausner ratio may be defined as the aerated volume of powder divided by its tamped volume. If the material easily forms lumps or balls, an optional agitator 104 may be utilized. The agitator 104 may be an additional roller positioned at the distal portion of the loading vessel 102, at the entry to the metering brush that may be powered cooperatively or oppositely to the metering brush. Alternatively, a reciprocating knife at the distal end of the vessel 102 which would cut the lumps or balls into smaller pieces may be utilized. Another embodiment may be a series of sharp needles placed on a wall of the loading vessel 102, which may reduce the size of the lumps as they were rotated by the bristles. The needles may be vibrated to provide additional abrasive functionality. The agitator 104 may be a stirrer, bar or reciprocating lever that levels powder in vessel 102, which may rotate, turn or otherwise agitate and reduces the size of a portion of the material before contact with the metering roller 106.

The particles may contact the metering roller 106 in a deagglomeration zone 126 that is formed by the angle of the stippling shoe 108 and metering roller 106. Any particles too large to penetrate the metering roller 106 are pinched or trapped between the outer surface of the roller 106 and stippling shoe 108 and abraded by the roller 106 in the deagglomeration zone 126, until reduced in size sufficient to be further processed. The stippling shoe 108 may be a single piece or be made of two or more parts, such as an upper stippling shoe 124 and lower stippling shoe 112. The stippling shoe 108 may be a portion of a formed wall of the housing 116, for example. The upper stippling shoe 124 may be positioned adjacent the metering roller and at least a portion of a surface the shoe closest to the metering roller 106 includes substantially the same curvature. Similarly, the lower shoe 112 may be positioned adjacent the high speed roller 128 and at least a portion of a surface the shoe closest to the high speed roller 128 includes substantially the same curvature. As the material is carried from the metering roller 106 to the first stippling roller 110, it may be stippled, smeared or both against the upper stippling shoe 124. Stippling refers to the action of short poking or flicking strokes (often in regard to a brush or bristles). The surface of the shoe may be conductive or insulative, depending on the material being processed. The stippling shoe 108 may be touching or very nearly touching the outer surface of both the metering roller 106 and high speed roller 128.

The metering roller 106 may be a brush, for example. The bristles of the brush may be fine, such as about 0.004 inches to about 0.008 inches in diameter. The bristles may be about 0.006 inches in diameter, for example. The bristles may be nylon bristles, for example. The color and stiffness of the bristles may be adjusted to provide the proper amount of particle penetration and release. The high speed roller 128 may be a brush as well. The bristles of the brush may be fine, such as about 0.010 inches to about 0.020 inches in diameter. The bristles may be about 0.016 inches in diameter, for example. The length of bristles may be many times their individual diameters. The metering roller 106 and high speed roller 128 may contact one another in order to assist with release of the particles and cleaning of the bristles. The bristles on each roller may interfere or contact each other at a depth or overlap of about $1/32$ inches to about $3/16$ inches, for example. Each roller may be electrically grounded to reduce electrical interaction with the material.

An optional air jet 118 or manifold may be positioned near the metering roller 106 and force air into at least one of the metering roller 106 or high speed roller 128 to assist in cleaning particles off the rollers after contacting each other. The air jet 118 may be one or more nozzles or a precision slit, for example.

Figure 2:
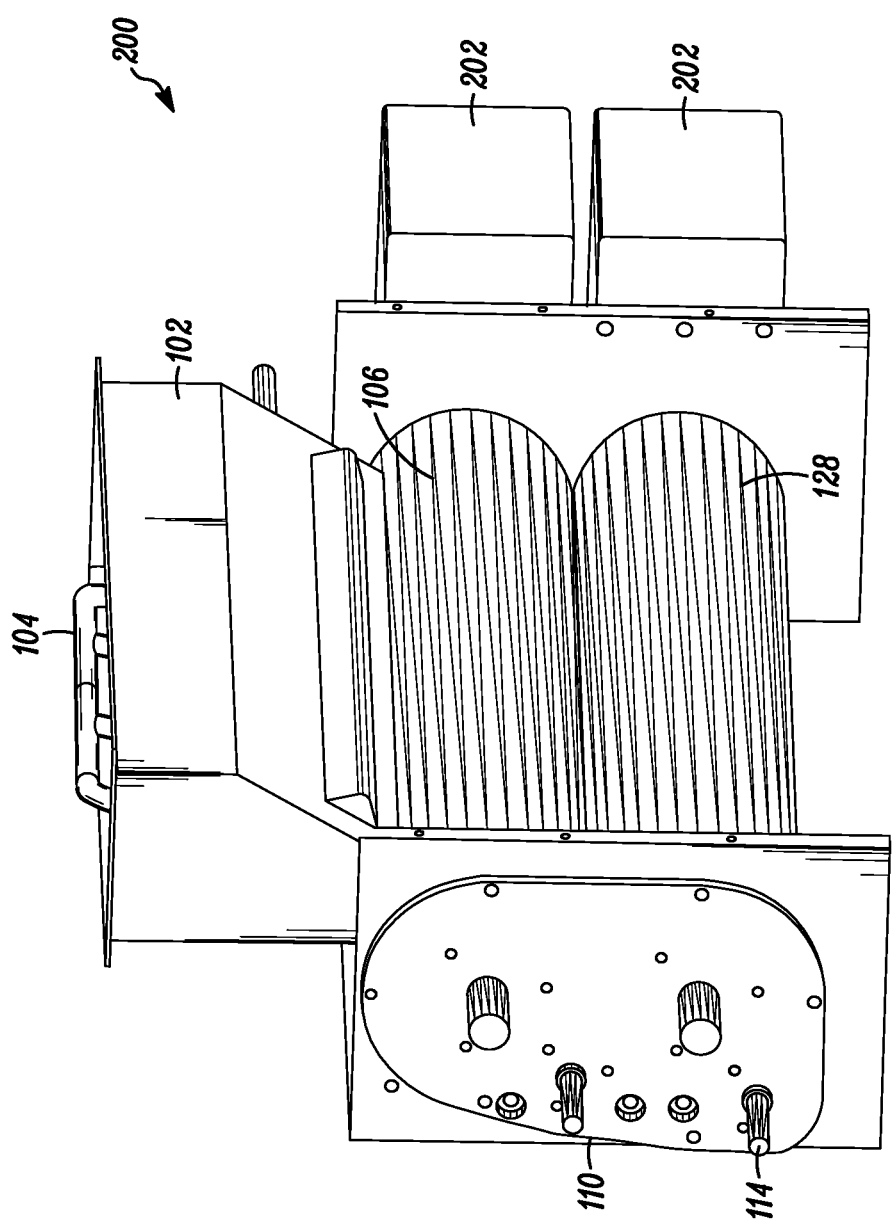
Figure 3:
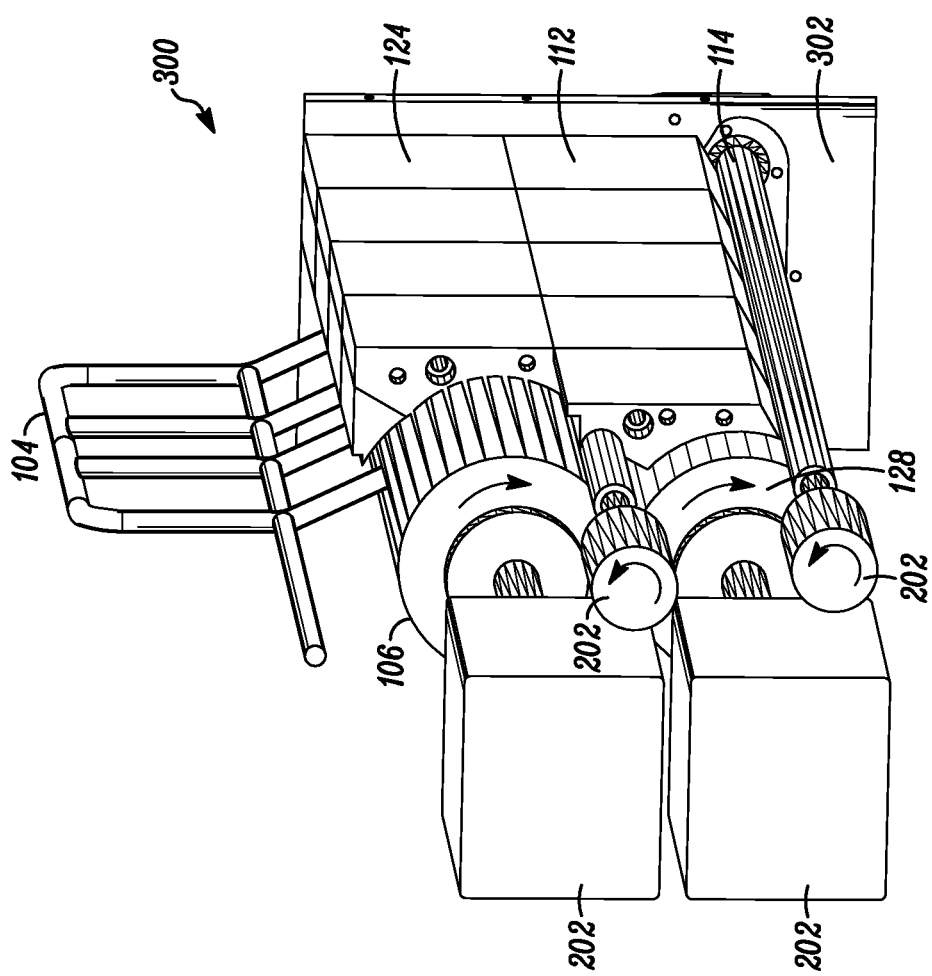
Figure 4:
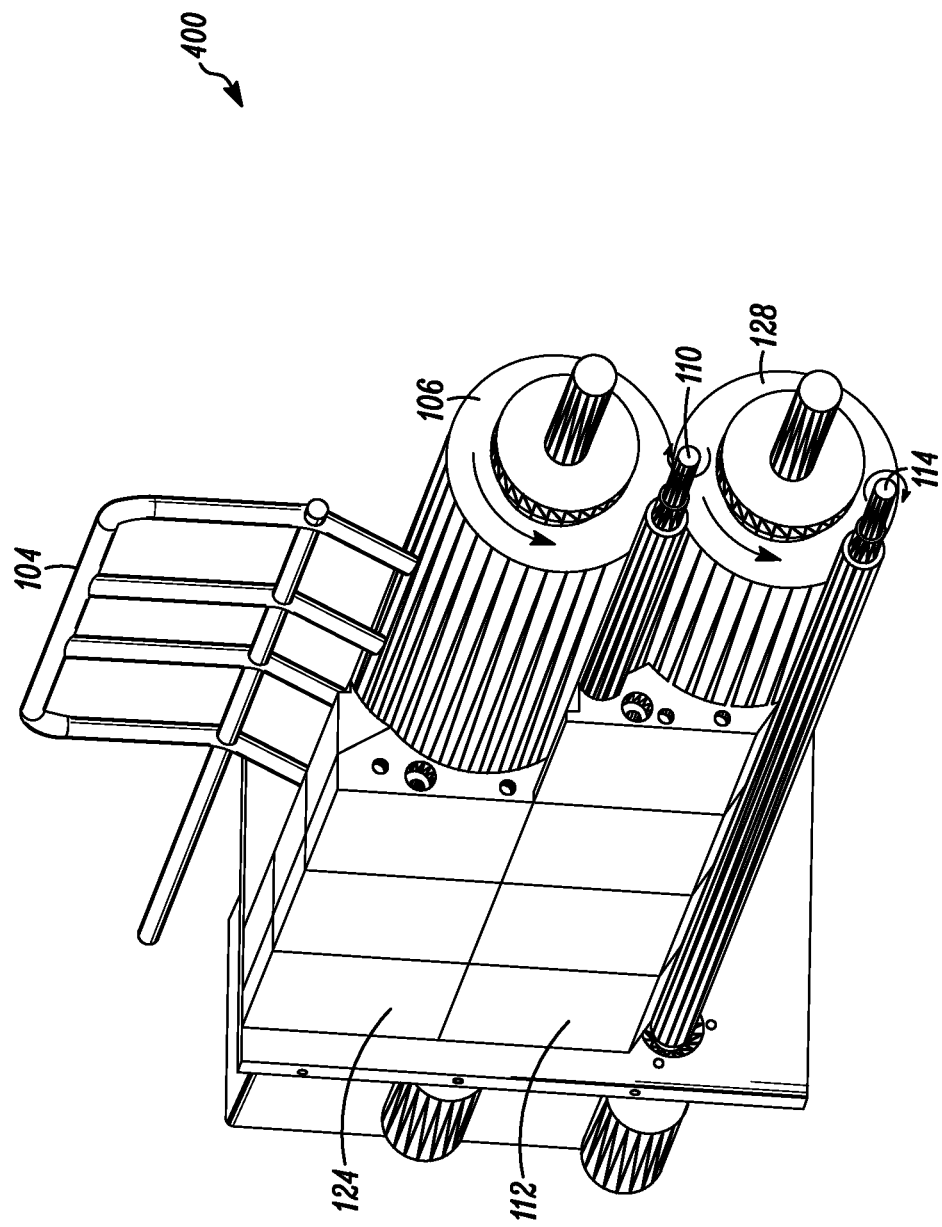

The particles penetrate the roller 106 in the deagglomeration zone 126 and are carried to the first stippling roll 110. The metering roller 106 and first stippling roller 110 may be operated together or independently, so long as they are rotated in an opposite direction in order to drop the particles into an aeration zone 130. The first and second stippling rollers 110, 114 may be solid rods. The rollers may be independently driven by motors (see 202 of view 200, FIG. 2). Views 300 and 400 of FIGS. 3 and 4, respectively, show cut-away views of the applicator, including the use of a bulkhead 302 to support all rollers.

Gravity or forced air may then lead the particles to contact the high speed roller 128 at the interface of the roller and stippling shoe 112. The particles slightly penetrate the roller 128 and are carried to the second stippling roller 114 where they are ejected as fine particles 122. A fine cloud, not atypical of smoke is produced from the applicator. Aerodynamic or gravimetric forces may then be used to deposit the particles 122 on a target substrate 120. Aerodynamic forces may cooperate with electrostatic forces as well, for application purposes. An exhaust system may be positioned near or adjacent the deposition or electrostatic zone. One example of an exhaust system may be a vacuum used to gently pull the fine particles in the direction of the target substrate. The vacuum may exert less force or pull than either gravity or the electrostatic attraction of the particles to the substrate, for example.

The geometry of the metering roller 106 and first stippling roller 110 and the high speed roller 128 and second stippling roller 114 cooperate. Each stippling roller may be positioned between the 90 degree position of the larger roller (i.e., metering or high speed) and the 150 degree position (where top dead center is zero degrees). The stippling rollers may be at least about 1/8 the diameter of the metering or high speed rollers, and not more than about 1/3 of their diameters.

Ratios of surface speeds are important. The metering roller 106 may be about 3 inches to about 12 inches in diameter and the first stippling roller 110 may be about 5/8 inches to about 1 inch in diameter with about 1/32 inches to about 3/16 inches radial interference or overlap.

The stippling surface speed should desirably not exceed the metering roll surface speed.

Examples of Operating Speeds

| Metering Rotational Speed | Stippling Rotational Speed | Surface Speed Differential |
| --- | --- | --- |
| 1/3 RPM | 1 RPM | x1.73 |
| 1/2 | 1.2 | 2.16 |
| 3/4 | 1.3 | 3.01 |

Similar brush and stippling roll diameters are used on the high speed roller.

| High Speed Brush Rotational Speed | Stippling Rotational Speed | Surface Speed Differential |
| --- | --- | --- |
| 86 RPM | 168 RPM | x2.66 |

Figure 5:
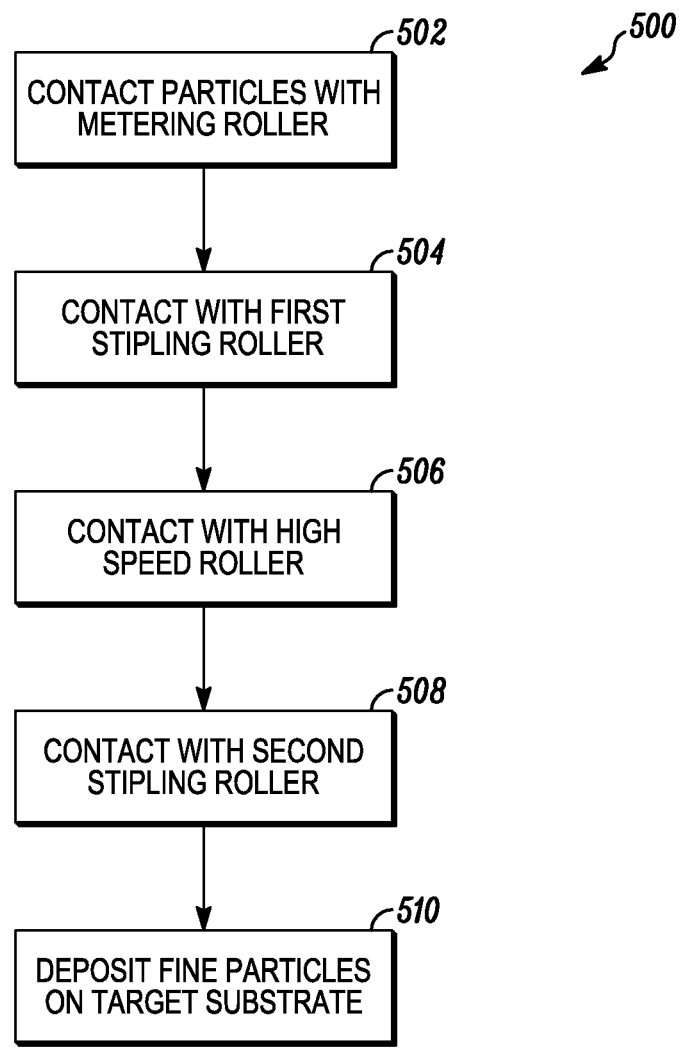

Referring to FIG. 5, a block flow diagram 500 of a method of applying fine particles is shown, according to some embodiments. Particles of a material are contacted with a rotating metering roller 502 in a deagglomeration zone, sufficient to control at least one of size, flow rate, mass or volume of the particles. The particles may be contacted with a first stippling roller 504, sufficient to drop the particles from the metering roller. The particles may be contacted with a high speed roller 506, then contacted with a second stippling roller 508, sufficient to eject fine particles of a smaller size than before contacting the metering roller. The fine particles may then be deposited 510 on a target substrate.

Figure 6:
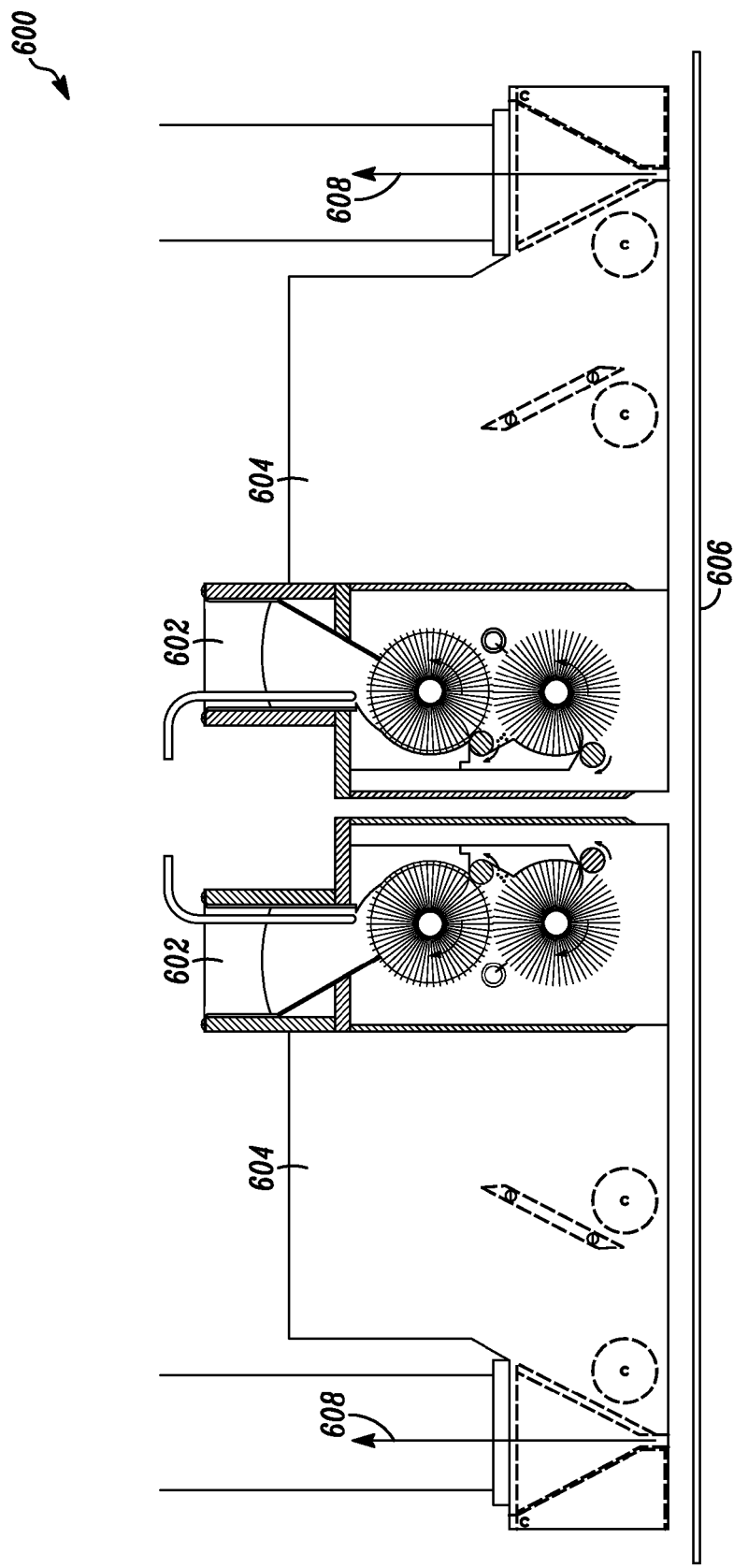

Referring to FIG. 6, a cross-sectional view 600 of a fine particle applicator system is shown, according to some embodiments. One or more fine particle applicators 602 may be utilized in an application or deposition system. In one embodiment, the applicators 602 may be placed adjacent each other, with each applicator 602 associated with an electrostatic zone 604 and exhaust system 608. The target substrate 606 may be positioned below the applicators 602, for example.

For additional precision in fine particle deposition, two applicators may be used in tandem, with each applying about ½ of the needed material. This may be particularly useful when the substrate is conveyed at high speed, as the applied charged particles do not completely dissipate their charge between the successive electrostatic depositions. Thus, the resulting uniformity is benefited during the second application by the repulsive forces of the particulate already on the substrate "steering" the newly incoming material to uncoated or lesser coated regions.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A fine particle applicator, comprising:

a loading vessel;

a metering roller, positioned adjacent the loading vessel;

a first stippling roller, in contact with the metering roller;

a high speed roller, positioned adjacent the metering roller such that bristles of the metering roller and bristles of the high speed roller overlap at least about 1/32 inches to form an interference zone;

a second stippling roller, in contact with the high speed roller;

a stippling shoe, positioned adjacent at least the metering roller and high speed roller;

a housing; and wherein at least a portion of a surface of the stippling shoe closest to at least the metering roller and high speed roller includes substantially the same curvature as the roller nearest the surface, and wherein the interactions between the metering roller, the high speed roller, and the stippling rollers allow the applicator to self-clean.

2. The applicator of claim 1, further comprising an agitator, positioned at least partially within the loading vessel.

3. The applicator of claim 1, further comprising an air jet.

4. The applicator of claim 1, wherein the first stippling roller turns in an opposite direction as the metering roller.

5. The applicator of claim 1, wherein the second stippling roller turns in an opposite direction as the high speed roller.

6. The applicator of claim 1, wherein the stippling shoe comprises an upper stippling shoe and a lower stippling shoe.

7. The applicator of claim 1, wherein the metering roller comprises a brush.

8. The applicator of claim 1, wherein the high speed roller comprises a brush.

9. The applicator of claim 1, wherein the metering roller and high speed roller rotate in opposite directions.

10. The applicator of claim 1, wherein the interference zone comprises an overlap of about 1/32 inches to about 3/16 inches.

11. A method of applying fine particles to a target substrate with a fine particle applicator as in claim 1, comprising:

contacting particles of a material with the metering roller in a deagglomeration zone, sufficient to control at least one of size, flow rate, mass or volume of the particles;

contacting the particles with the first stippling roller, sufficient to drop the particles from the metering roller;

contacting the particles with the high speed roller;

contacting the particles with the second stippling roller, sufficient to eject fine particles of a smaller size than before contacting the metering roller; and depositing the fine particles on the target substrate.

12. The method of claim 11, wherein particles comprise one or more of salts, sugars, cinnamon, micro-salt, soy protein, cocoa, whey protein, powdered cheese, corn and potato starch, and menthol flavor.

13. A fine particle applicator system, comprising:

two or more fine particle applicators;

one or more electrostatic zones; and one or more exhaust systems;

wherein the fine particle applicator includes:

a loading vessel;

a metering roller, positioned adjacent the loading vessel;

a first stippling roller, in contact with the metering roller;

a high speed roller, positioned adjacent the metering roller such that bristles of the metering roller and bristles of the high speed roller overlap at least about 1/32 inches to form an interference zone;

a second stippling roller, in contact with the high speed roller;

a stippling shoe, positioned adjacent at least the metering roller and high speed roller;

a housing; and wherein at least a portion of a surface of the stippling shoe closest to at least the metering roller and high speed roller includes substantially the same curvature as the roller nearest the surface, and wherein the interactions between the metering roller, the high speed roller, and the stippling rollers allow the applicator to self-clean.

14. The applicator of claim 13, wherein the metering roller and high speed roller rotate in opposite directions.

15. The applicator of claim 13, wherein the interference zone comprises an overlap of about 1/32 inches to about 3/16 inches.

16. The applicator of claim 1, wherein at least one of the rollers is electrically grounded.

17. The applicator of claim 13, wherein at least one of the rollers is electrically grounded.

* * * * *